US010050457B2

(12) United States Patent
Todasco

(10) Patent No.: US 10,050,457 B2
(45) Date of Patent: Aug. 14, 2018

(54) SMART CHARGING OF USER DEVICES

(71) Applicant: PAYPAL, INC., San Jose, CA (US)

(72) Inventor: Michael Charles Todasco, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 86 days.

(21) Appl. No.: 14/821,615

(22) Filed: Aug. 7, 2015

(65) Prior Publication Data

US 2017/0040815 A1 Feb. 9, 2017

(51) Int. Cl.
| | |
|---|---|
| *H02J 7/00* | (2006.01) |
| *H01F 27/42* | (2006.01) |
| *H01F 37/00* | (2006.01) |
| *H01F 38/00* | (2006.01) |
| *G06Q 20/32* | (2012.01) |
| *H02J 7/02* | (2016.01) |
| *H02J 50/10* | (2016.01) |

(52) U.S. Cl.
CPC .......... *H02J 7/0047* (2013.01); *G06Q 20/322* (2013.01); *H02J 7/0027* (2013.01); *H02J 7/025* (2013.01); *H02J 50/10* (2016.02); *H02J 2007/005* (2013.01); *H02J 2007/0062* (2013.01); *H02J 2007/0096* (2013.01)

(58) Field of Classification Search
CPC .. H02J 7/025; H02J 50/10; H02J 50/12; H02J 50/80
USPC ........................................... 320/108; 307/104
See application file for complete search history.

(56) References Cited

U.S. PATENT DOCUMENTS

| | | | | |
|---|---|---|---|---|
| 2010/0248622 | A1* | 9/2010 | Lyell Kirby | H02J 7/025 455/41.1 |
| 2011/0320828 | A1* | 12/2011 | Boss | G06F 1/3209 713/300 |
| 2012/0223589 | A1* | 9/2012 | Low | H04B 5/0037 307/104 |
| 2013/0062966 | A1* | 3/2013 | Verghese | H02J 7/025 307/104 |
| 2014/0217967 | A1* | 8/2014 | Zeine | H02J 7/025 320/108 |

\* cited by examiner

*Primary Examiner* — David V Henze-Gongola
(74) *Attorney, Agent, or Firm* — Haynes & Boone, LLP

(57) ABSTRACT

A charger device may include a coupling component configured to deliver power for charging user devices and a wireless interface configured to broadcast wireless signals. The coupling component may include a connector that may be plugged into a user device or an inductive coil to be inductively coupled to a user device. The charger device may determine whether the coupling component is coupled to a user device and transmit via the wireless interface an "available" signal indicating the charger device is available in response to determining the coupling component is not coupled. The user device may provide a notification to the user based, at least in part, on receiving the "available" signal. The user device may provide the notification further based on other information, such as activity of a user detected by the user device, a geolocation determined by the user device, or information received from a service provider.

20 Claims, 12 Drawing Sheets

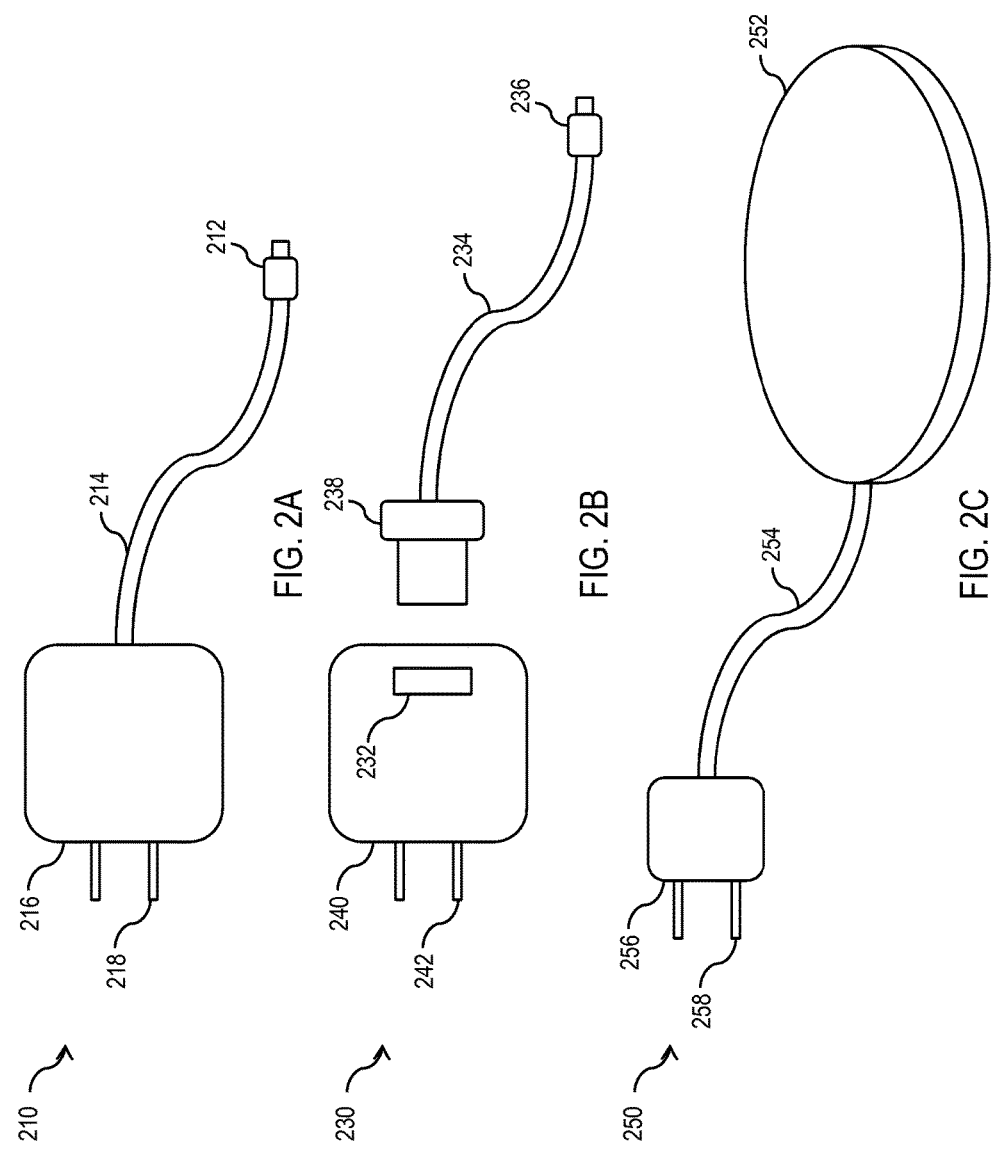

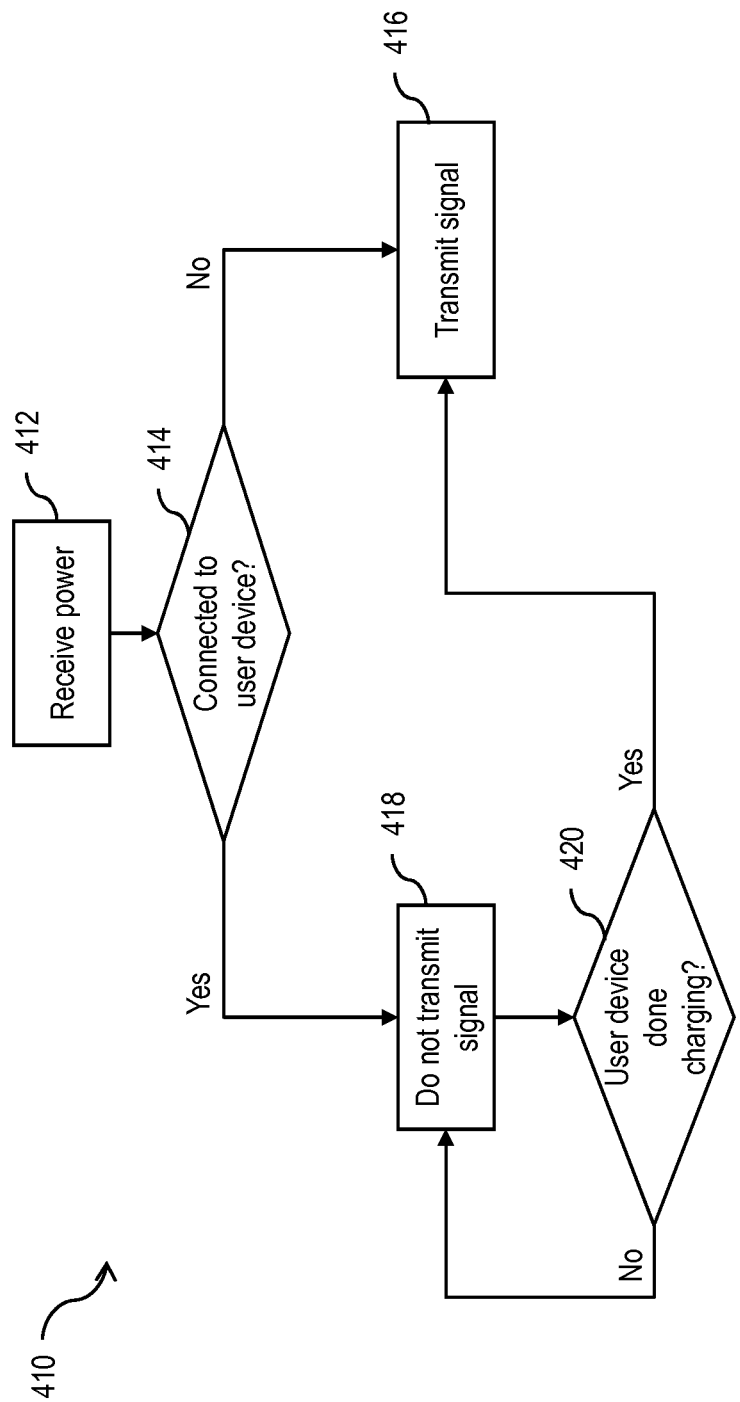

SMART CHARGING OF USER DEVICES

TECHNICAL FIELD

The present disclosure relates to electronic charging devices and, more particularly, to electronic charging devices configured to communicate with other devices.

BACKGROUND

A conventional plug-in charger device for user devices, such as a cell phone charger, includes power adapter components that convert alternating current (AC) to direct current (DC). Charging circuitry that charges a battery of the user device may be included in the user device, which is typical for cell phones, and may receive power from the charger device to charge the battery. Alternatively, the charging circuitry may be included in the charger device.

A conventional wireless charger device, such as an inductive charger, may include an induction coil to create an alternating electromagnetic field. A corresponding induction coil in a user device may receive power from the alternating electromagnetic field to drive an electric current to charge a battery of the user device.

A conventional charger device is unable to notify a user who wants to charge his or her user device when it is not occupied by another user device. Furthermore, although a user device may provide a notification for low battery, it is not able to take into account whether a charger device is available or whether the user is busy.

BRIEF DESCRIPTION OF THE DRAWINGS

FIGS. 2A-C illustrate charger devices according to one or more embodiments of the present disclosure.

FIGS. 4A-B illustrate flow diagrams of processes for broadcasting signals by a charger device according to one or more embodiments of the present disclosure.

Figure 1A:
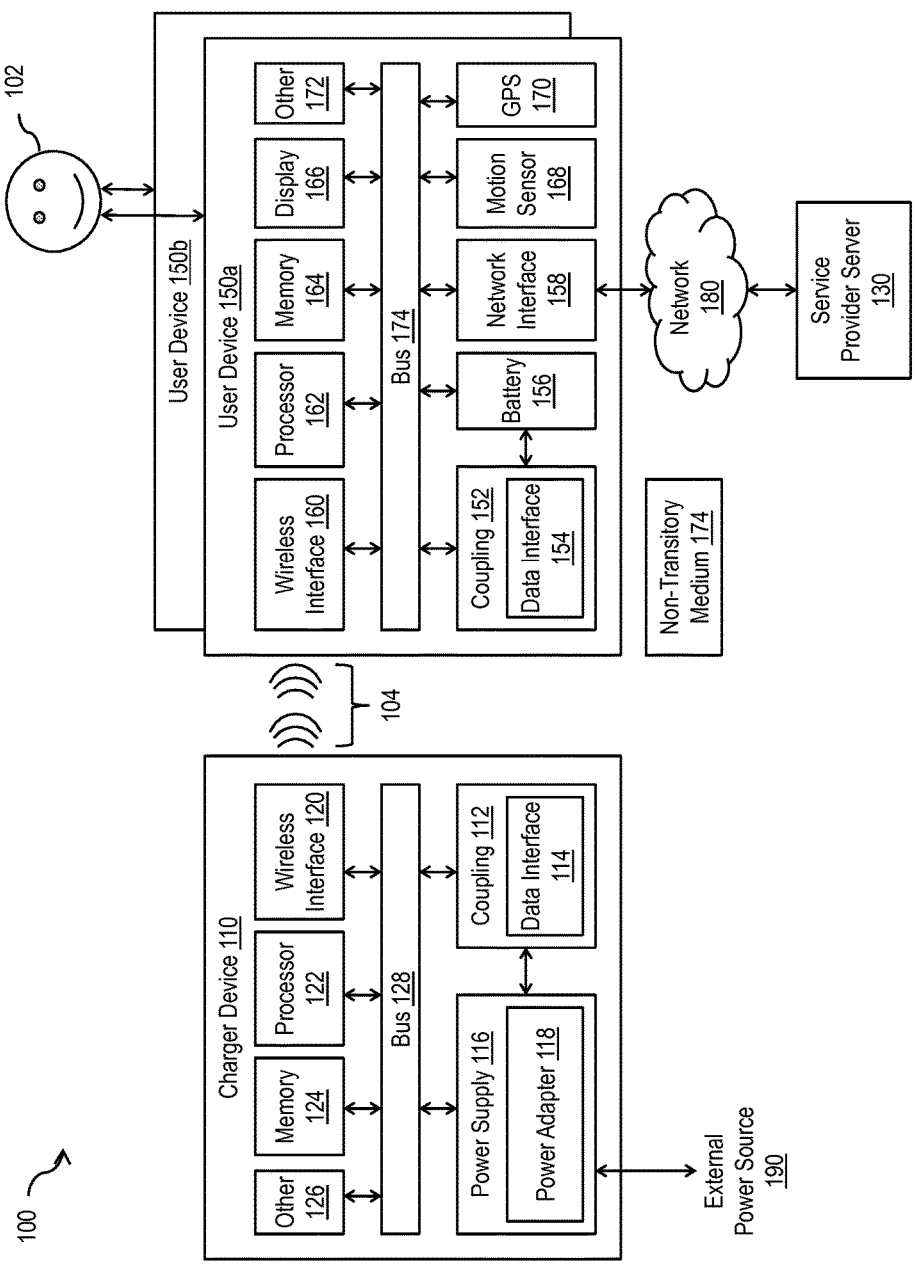
FIGS. 1A-B illustrate block diagrams of a charger device and a user device according to one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides devices, systems, and methods relating to charger devices configured to wirelessly communicate with other devices. In the following description, specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope of this disclosure.

In one or more embodiments, a charger device may be a charger, power adapter, or an external power source that delivers power for charging user devices such as mobile phones (e.g., cell phones, smartphones, etc.), wearable devices, computers, tablets, or other user devices. The charger device includes a coupling component configured to deliver power to charge user devices and a wireless interface configured to transmit signals. The coupling component may include a connector that may be plugged into a user device. Alternatively, the coupling component may include an inductive coil that may be inductively coupled to a user device. The wireless interface may transmit at least one of Bluetooth® signals such as Bluetooth® Low Energy (BLE) (also called Bluetooth® Smart) signals, Wi-Fi® signals, infrared (IR) signals, visible light signals, or radio frequency (RF) signals.

In one or more embodiments, a charger device may determine whether the coupling component is connected to or otherwise coupled to a user device and transmit via the wireless interface an "available" signal indicating the charger device is available in response to determining the coupling component is not coupled. The user device may provide a notification to the user based, at least in part, on receiving the "available" signal. In some embodiments, the charger device stops transmitting the "available" signal in response to determining the coupling component is coupled to the user device. In other embodiments, the charger device stops transmitting the "available" signal in response to determining the coupling component is coupled to the user device that is charging, and resumes transmitting the "available" signal in response to determining the coupling component is coupled to the user device that is done charging.

In some embodiments, the coupling component may include a data interface to communicate data between the charger device and the coupled user device. The charger device may receive via the data interface an identifier (e.g., a device identifier or a user identifier) from the user device while the coupling component is coupled to or electronically connected to the user device, and transmit a "done charging" signal that includes the identifier indicating that the user device is done charging in response to determining the coupling component is coupled to the user device that is done charging. Another user device that is bonded to, paired to, linked with, or otherwise associated with the user device may, in response to receiving the "done charging" signal, recognize the identifier included in the "done charging" signal and provide the user a notification indicating the user device is done charging.

For example, a user may have a wearable device that is paired with his or her smartphone (e.g., via Bluetooth® pairing). The smartphone may store a device identifier for the wearable device. A charger device may transmit an "available" signal to the smartphone and/or wearable device, and the smartphone and/or the wearable device may notify the user to charge the wearable device. When the user plugs in the connector of the charger device to the wearable device, the charger device may stop transmitting the "available" signal. The charger device may access the wearable device for the device identifier via the connector. When the wearable device is done charging, the charger device may transmit a "done charging" signal. When the smartphone receives the "done charging" signal, the smartphone may recognize the device identifier included in the "done charging" signal and notify the user that the wearable device is done charging, for example, by presenting a notification on a display of the smartphone. In another example, the smartphone may be the device that is charged, and the wearable device may be the device that receives the "done charging" signal and notify the user that the smartphone is done charging, for example, by providing a vibration or by presenting a notification on a display or an indicator, such as a light-emitting diode (LED), of the wearable device.

In one or more embodiments, a user device, or a service provider server in communication with a user device, may determine a charger device is available in response to the user device receiving an "available" signal from the charger device, determine an amount of power remaining in a battery of the user device, and provide a notification to charge the user device based, at least in part, on receiving the "available" signal and the amount of power remaining in the battery.

In some embodiments, the notification to charge the user device may further be provided based on activity data. The activity data may be tracked by a motion sensor of the user device. The activity data may include, for example, recent activity data indicating whether the user has been recently active and/or activity history data indicating whether the user is usually active at that time of the day in general or at that day of the week. For example, the user device may notify the user to charge the user device if the charger device is available, the battery is low, and the user has been idle for 5 minutes or is typically idle during that time of the day, presuming that the user does not need the user device at the moment.

In some embodiments, the notification to charge the user device may further be provided based on a geolocation of the user device. The geolocation may be determined via a global positioning system (GPS) of the user device. For example, the user device may notify the user to charge the user device if the charger device is available, the battery is low, and the user is determined to be at home based on the geolocation.

In some embodiments, the notification to charge the user device may further be provided based on battery usage data of the user device. The battery usage data may be used to forecast how much power is required by the battery, for example, to get through the day. The battery usage data may also be used to determine when to charge and how much to charge to maximize battery life.

In yet further embodiments, the notification to charge the user device may be based on the amount of power remaining with the charger device. For example, with charger devices using a battery or other finite source of power, a notification may be sent even when a currently coupled and charging user device is not at 100% power. In one embodiment, the notification is sent based on the remaining power level of the charger device, how many user devices need charging (e.g., less than 100% power), the power level of the currently charging user device, and the power level of the user devices needing to be charged. Various thresholds can be used based on preferences and usage. In this way, more user devices may be charged and the charger device more efficiently utilized.

Figure 1B:
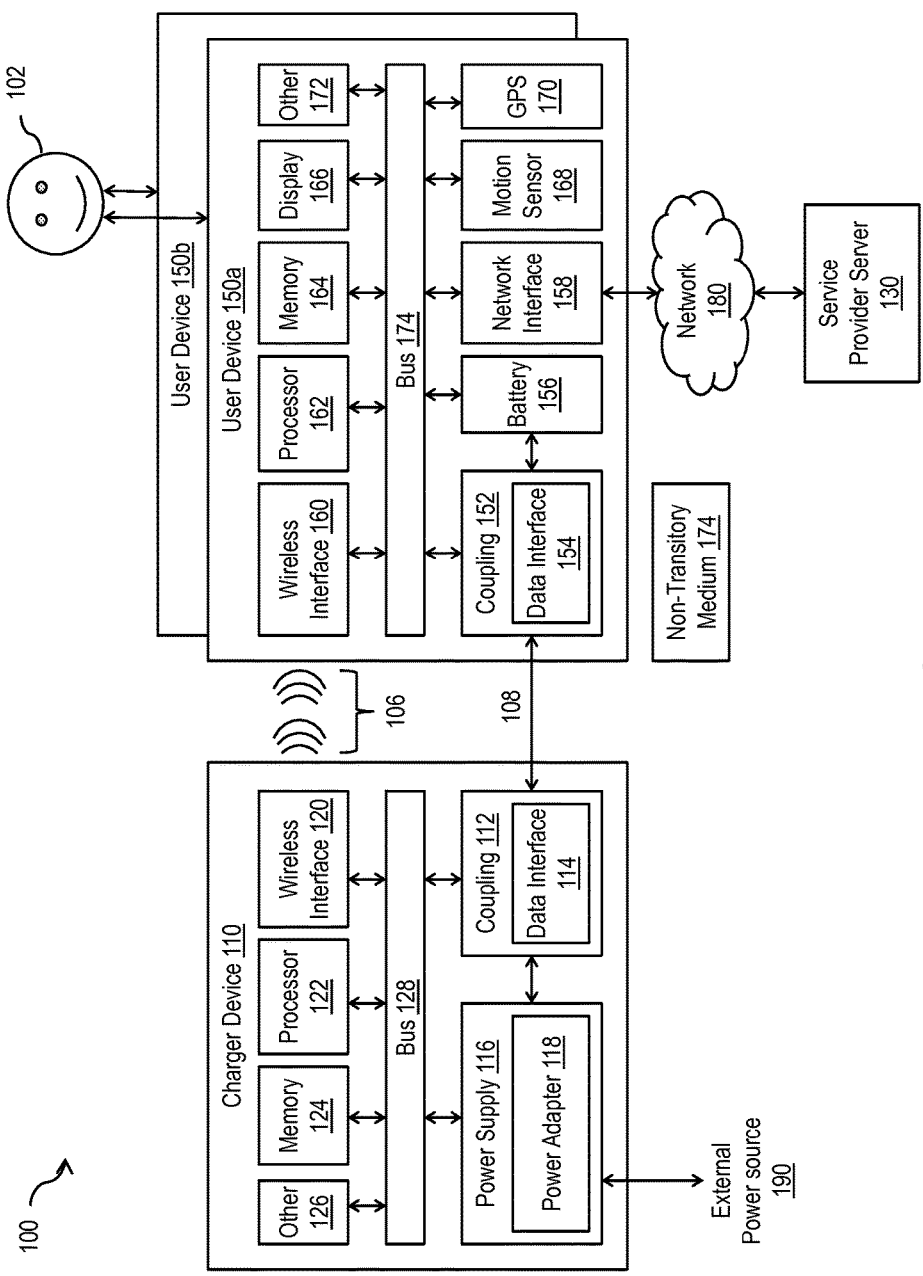

FIGS. 1A-B illustrate block diagrams 100 of a charger device 110 and one or more user devices 150, such as user devices 150a and 150b, of a user 102, according to one or more embodiments of the present disclosure.

Charger device 110 may include a coupling component 112, power supply components 116, a wireless transceiver or other wireless interface 120, a processor 122, a memory 124, and/or other components 126 that are interconnected by a bus 128 or other communication mechanism for communicating information between the various components.

Coupling component 112, in various embodiments, is configured to be connected to or otherwise coupled to user device 150 via a coupling component 152 of user device 150. Coupling component 112 may include a data interface 114 configured to communicate data to and from user device 150.

In some embodiments, coupling component 112 includes a connector (e.g., a micro-Universal Serial Bus (USB)™ connector, a mini-USB™ connector, a Lightning™ connector from Apple®, etc.), such as a plug or a receptacle, to be connected to user device 150. The connector may include one or more power pins configured to charge user device 150 by delivering power received from power supply components 116 to user device 150. The connector may also include one or more data pins to provide data interface 114 for transmitting and receiving data. The connector may include one or more other pins such as a ground pin.

Alternatively, coupling component 112 includes components to wirelessly couple to user device 150 via coupling component 152 of user device 150. For example, coupling component 112 may include an inductive coil to be inductively coupled to a corresponding inductive coil in coupling component 152 and provide an alternating electromagnetic field for charging user device 150. Coupling component 112 may implement other techniques and mechanisms for wirelessly delivering power to user device 150, such as wireless conductive charging.

Power supply components 116, in various embodiments, deliver power to coupling component 112. In some embodiments, power supply components 116 may include power adapter components 118 that convert alternating current (AC) received from an external power source 190, such as an AC power outlet, to direct current (DC) while charger device 110 is connected to (e.g., by plugging into) external power source 190. Power adapter components 118 may include, for example, a transformer, a rectifier, a filter, and/or a regulator. The transformer may step down the voltage of the AC power received from external power source 190. The rectifier may convert the AC signal to a DC signal. The filter may smooth out the DC signal, and a regulator may help keep the output DC signal steady. In some embodiments, power supply components 116 may include a battery (e.g., a portable battery) that provides power to coupling component 112. The battery may receive AC power from external power source 190 and be charged when charger device 110 is connected to external power source 190.

Wireless interface 120, in various embodiments, is configured to transmit (e.g., broadcast) and/or receive one or more signals including signal 104 and signal 106 shown in FIG. 1A and FIG. 1B respectively. Wireless interface 120 may include a wireless communication component, such as a wireless transmitter or a wireless transceiver for local wireless communications. Wireless interface 120 may transmit one or more sequences of information via one or more signals 104, 106 such that when user device 150 capable of receiving information from wireless interface 120 comes within a communication range of wireless interface 120, the device may receive a communication from wireless interface 120 and be instructed to perform action, such as displaying a notification (e.g., a "charger available" notification, a "done charging" notification, etc.).

In some embodiments, wireless interface 120 may include a Bluetooth® transceiver or transmitter, such as a BLE transceiver or transmitter. BLE is a technology that transmits information at a frequency of about 2.4 GHz (about 2042-2480 MHz) over forty 2 MHz-wide channels, and has a range of about 100 meters or about 320 feet. Information transmitted according to the BLE protocol may be transmitted at a rate of about 1 Mbit/s with an application throughput of about 0.27 Mbit/s. In some embodiments, BLE communications may be secured using 128-bit Advanced Encryption Standard (AES) encryption with counter mode with a cipher block chaining message authentication code (CBC-MAC) and user defined security. Further, in some embodiments, BLE communications may utilize adaptive frequency hopping, lazy acknowledgement, a 24-bit cyclic redundancy check (CRC), and 32-bit message integrity check for robustness. Moreover, in some embodiments, BLE-capable devices may consume a fraction of the power of standard Bluetooth® devices due to the BLE protocol allowing low duty cycles, and being designed for applications that may not require continuous data transfer. In other embodiments, wireless interface 120 may include a Wi-Fi® transceiver or transmitter, a RF transceiver or transmitter, an IR transceiver or transmitter, or other wireless transceiver or transmitter. Corresponding to the type of wireless interface 120 that is implemented, signals 104 and 106 may be Bluetooth® signals such as BLE signals, RF signals, IR signals, or other wireless signals.

Processor 122, in various embodiments, may include one or more microprocessors, microcontrollers, hardwired logic devices such as application-specific integrated circuits (ASICs), programmable logic devices (PLDs) such as field-programmable gate arrays (FPGAs), or other processing systems. In some embodiments, processor 122 may execute instructions stored on memory 124 which causes processor 122 to perform operations described herein. In other embodiments, processor 122 may be hardwired to perform the operations described herein.

As shown in FIG. 1A, processor 122 may be configured to determine that coupling component 112 is not coupled to user device 150, and in response operate wireless interface 120 to transmit (e.g., broadcast) an "available" signal 104 indicating charger device 110 is available to charge user device 150. For example, "available" signal 104 may transmit a data packet that includes a message indicating charger device 110 is available and/or a timestamp.

As shown in FIG. 1B, processor 122 may be configured to determine that coupling component 112 is coupled to user device 150 via a connection or other coupling 108, and in response operate wireless interface 120 to not transmit an "available" signal (e.g., "available" signal 104 shown in FIG. 1A). Processor 122 may operate data interface 114 of coupling component 112 or wireless interface 120 to receive an identifier such as the device identifier of user device 150 and/or a user identifier from user device 150, and may store the identifier in memory 124. Processor 122 may further be configured to determine that coupling component 112 is coupled to user device 150 via connection/coupling 108 and that user device 150 is done charging, and in response operate wireless interface 120 to transmit a "done charging" signal 106 indicating user device 150 is done charging. For example, "done charging" signal 106 may transmit a data packet that includes a message indicating user device 150 is done charging, the identifier (e.g., the device identifier of user device 150 and/or the user identifier), and/or a timestamp.

In some embodiments, while charger device 110 is coupled to user device 150 via connection or other coupling 108 as shown in FIG. 1B, processor 122 may operate data interface 114 of coupling component 112 or wireless interface 120 to receive location data from user device 150 determined by a location component such as a GPS 170 of user device 150 and store the location data in memory 124. Processor 122 may then determine that coupling component 112 is not coupled to user device 150 as shown in FIG. 1A, and in response operate wireless interface 120 to transmit (e.g., broadcast) "available" signal 104 indicating charger device 110 is available to charge user device 150 and a geolocation of charger device 110. For example, "available" signal 104 may transmit a data packet that includes a message indicating charger device 110 is available, the location data, and/or a timestamp.

The location data included in "available" signal may be the location data received from the most recently coupled user device 150 that includes location component 170, and the location data stored in memory 124 may be updated each time user device 150 that includes location component 170 is coupled to charger device 110. The location data received from one of user devices 150 may be used repeatedly for "available" signal 104, for example, until charger device 110 is disconnected from (e.g., by unplugging from) external power source 190 and/or the location data is updated when charger device 110 is coupled to another user device 150 that includes location component 170.

In further embodiments, charger device 110 includes its own location component that determines a geolocation to be included in "available" signal 104 as location data. In yet further embodiments, location data may be provided by user 102. For example, user 102 may enter in a geolocation on user device 150, which may be communicated to charger device 110 via data interface 114 of coupling component 112 or wireless interface 120. In another example, for charger devices 110 at a charging station or kiosk where charger devices 110 are placed at a particular location by a merchant or a service provider, the merchant or the service provider may program the location data into charger devices 110.

Providing a geolocation of charger device 110 in "available" signal 104 may be advantageous when charger device 110 is at a location that is not easily visible or when there are multiple charger devices 110 at a location. Also, providing a geolocation of charger device 110 in "available" signal 104 may be advantageous for charger devices 110 that are provided (e.g., for free or for a fee) at various public or private locations for use by many users 102 such as the general public. For example, charger stations or kiosks that provide charger devices 110 for a fee may be located in discrete places yet still allow users 102 to find the charger stations or kiosks when their user devices 150 needs to be charged.

Figure 3:
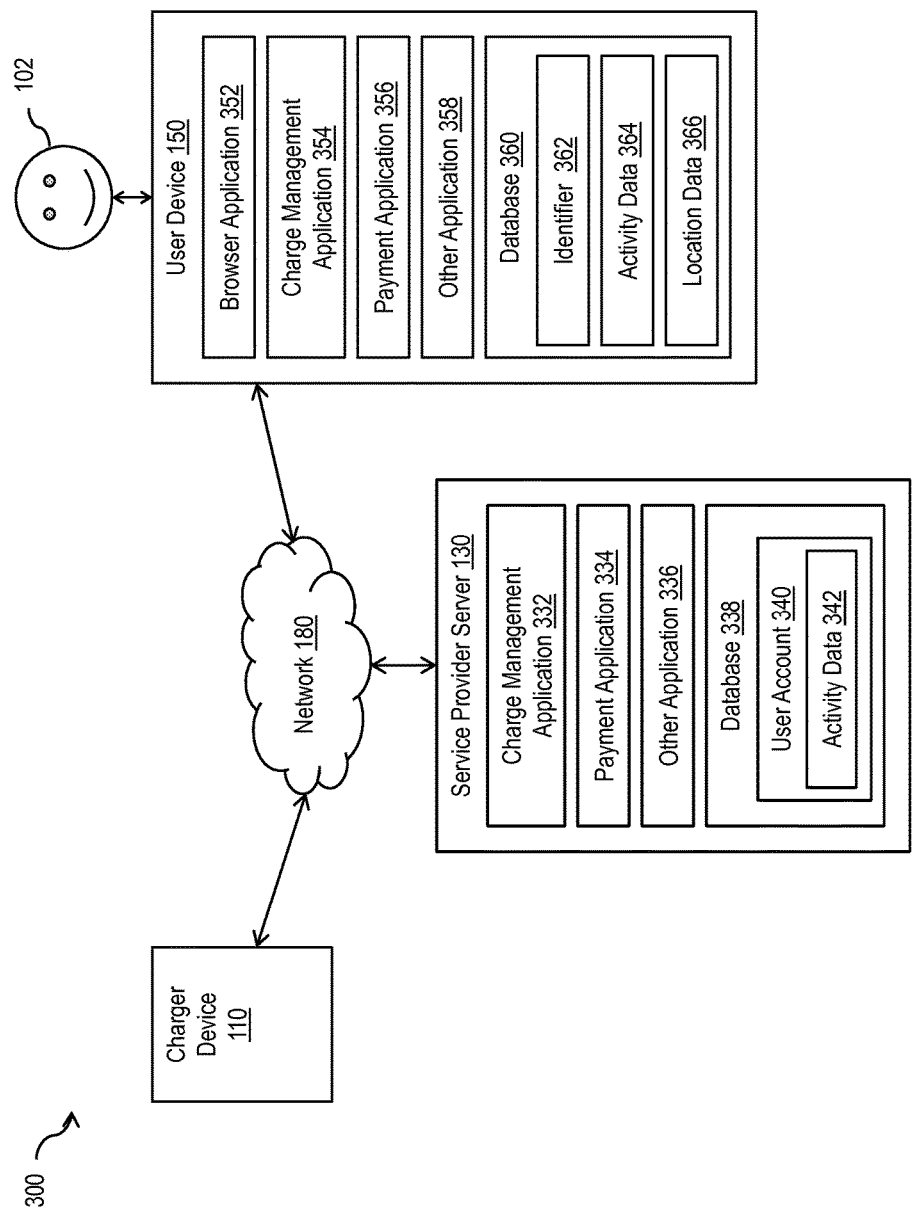
FIG. 3 illustrates a block diagram of a networked system according to one or more embodiments of the present disclosure.

In one or more embodiments, charger device 110 may include other components 126, such as a network interface configured to communicate with a service provider server 130 and/or user device 150 over a network 180 (as shown in FIG. 3). In some embodiments, other components may include a location component such as a GPS configured to determine a geolocation. In some embodiments, other components 126 include charging circuitry configured to charge a battery 156 in user device 150. In other embodiments, charging circuitry is included in user device 150, which is typical for user devices such as mobile phones.

Each of one or more user devices 150, such as user devices 150a and 150b, may be a mobile phone (e.g., a cell phone, a smartphone, etc.), a wearable device (e.g., an activity tracker, a fitness tracker, a head-mounted display (HMD) device, a smartwatch, etc.), a tablet, a personal computer, a laptop, a notebook, a set-top box, a video game console, or other user device. User device 150 may include coupling component 152, battery 156, a network interface 158, a wireless interface 160, a processor 162, a memory 164, a display 166, one or more motion sensor components 168, location component such as GPS 170, and/or other components 172 that are interconnected by a bus 174 or other communication mechanism for communicating information.

Coupling component 152, in various embodiments, is configured to be coupled to charger device 110 via coupling component 112 of charger device 110. Coupling component 152 may include a data interface 154 configured to communicate data to and from charger device 110.

In some embodiments, coupling component 152 includes a connector (e.g., a micro-USB™ connector, a mini-USB™ connector, a Lightning™ connector from Apple®, etc.), such as a plug or a receptacle, to be connected to coupling component 112 of charger device 110. The connector may include one or more power pins configured to receive power from power supply components 116 via coupling component 112. The connector may also include one or more data pins to provide data interface 154 for transmitting and receiving data. The connector may include one or more other pins such as a ground pin.

Alternatively, coupling component 152 may include components to wirelessly couple to charger device 110 via coupling component 112 of charger device 110. For example, coupling component 152 may include an inductive coil to be inductively coupled to the inductive coil of charger device 110. Coupling component 152 may convert the alternating electromagnetic field generated by the inductive coil of charger device 110 to electric current for charging battery 156. Coupling component 152 may implement other techniques and mechanisms for wirelessly receiving power from charger device 110, such as wireless conductive charging.

Network interface 158, in various embodiments, is configured to communicate with other devices or servers over network 180. For example, user device 150 may communicate with service provider server 130 via network interface 158. In some embodiments, network interface 158 includes a wireless communication component, such as a wireless broadband component, a wireless satellite component, or various other types of wireless communication components including RF, microwave frequency (MWF), and/or IR components configured to communicate with network 180. In some embodiments, network interface 158 is configured to interface with a coaxial cable, a fiber optic cable, a digital subscriber line (DSL) modem, a public switched telephone network (PSTN) modem, an Ethernet device, and/or various other types of wired and/or wireless network communication devices configured to communicate with network 180.

Network 180, in various embodiments, may be implemented as a single network or a combination of multiple networks. For example, network 180 may include the Internet and/or one or more intranets, landline networks, wireless networks, and/or other appropriate types of communication networks. In another example, network 108 may comprise a wireless telecommunications network (e.g., cellular phone network) adapted to communicate with other communication networks, such as the Internet.

Wireless interface 160, in various embodiments, is configured to transmit and receive one or more signals including signal 104 and signal 106, shown in FIG. 1A and FIG. 1B respectively. Wireless interface 160 may include a wireless communication component, such as a wireless transceiver for local wireless communications. Wireless interface 160 may receive one or more sequences of information via one or more signals 104, 106 from wireless interface 120 of charger device 110 when within the range of wireless interface 120. In some embodiments, wireless interface 160 may include a Bluetooth® transceiver, such as a BLE transceiver, as further described above in relation to wireless interface 120. In other embodiments, wireless interface 160 may include a Wi-Fi® transceiver, a RF transceiver, an IR transceiver, or other wireless transceiver. Corresponding to the type of wireless interface 160 that is implemented, signals 104, 106 may be Bluetooth® signals such as BLE signals, Wi-Fi® signals, RF signals, IR signals, or other wireless signals.

Processor 162, in various embodiments, may include one or more microprocessors, microcontrollers, hardwired logic devices such as ASICs, PLDs such as FPGAs, or other processing systems. In some embodiments, processor 162 may execute instructions stored on memory 164 or a non-transitory medium 174 which causes processor 162 to perform operations described herein.

As shown in FIG. 1A, processor 162 may be configured to determine charger device 110 is available in response to wireless interface 160 receiving "available" signal 104 from charger device 110 when charger device 110 is not coupled and charger device is within broadcast range of charger device 110. Processor 162 may provide a notification to charge user device 150 based on an amount of power remaining in battery 156, activity data tracked by motion sensor components 168, location data determined by location component 170, and/or other information or data related to user 102 received from service provider server 130. In some embodiments, "available" signal 104 includes a geolocation of charger device and the notification may include the geolocation of charger device 110, which may be displayed, for example, on a map.

Display 166, in various embodiments, is configured to display information to user 102. Display 166 may include an LED screen, an organic light-emitting diode (OLED) screen such as an active matrix OLED (AMOLED) screen, a liquid crystal display (LCD) screen, a plasma display panel (PDP) screen, or a cathode ray tube (CRT) screen. Display 166 may further include an input component. For example, display 166 may be a touchscreen display configured to present a graphical user interface (GUI) to user 102 and receive a user interaction with the GUI.

One or more motion sensors 168, in various embodiments, are configured to detect (e.g., track, monitor, quantify, capture, measure, and/or otherwise detect) movement, such as activity of user 102, to generate activity data, which may be stored in memory 164 and/or transmitted to service provider server 130 via network 180. One or more motion sensors 168 may include one or more accelerometers that measures acceleration and a gyroscope that measures orientation that may be used together to detect the movement/activity of user 102.

Location component 170, in various embodiments, determines a geolocation of user device 150. Location component may be implemented as a GPS that uses satellite-based positioning and/or assisted GPS (A-GPS) that uses cell tower information to improve reliability and accuracy of GPS-based positioning. In one implementation, the geolocation may include GPS coordinates, zip-code information, area-code information, street address information, and/or various other generally known types of location data or information.

In one or more embodiments, user device 150 may include other components 172, such as charging circuitry configured to charge battery 156 using power received by coupling component 152 from charger device 110. In other embodiments, the charging circuitry may be included in charger device 110.

FIGS. 2A-C illustrate charger devices 210, 230, and 250 such as charger device 110 in FIGS. 1A-B, according to one or more embodiments of the present disclosure.

As shown in FIG. 2A, charger device 210 may include coupling component 112 (in FIGS. 1A-B) implemented as a connector such as plug 212 and a captive power cable 214 that is connected to plug 212 and fixedly attached to a housing 216. Plug 212 may be removably connected to coupling component 152 (in FIGS. 1A-B) of user device 150, which may be implemented as a receptacle corresponding to plug 212. Housing 216 may include various other components of charger device 210, such as power supply components 116, wireless interface 120, and other components of charger device 110 shown in FIGS. 1A-B. Power supply components 116 of charger device 210 may include a power plug 218 or other connector provided on housing 216 to be plugged into an AC power outlet, such as external power source 190 (in FIGS. 1A-B).

As shown in FIG. 2B, charger device 230 may include coupling component 112 (in FIGS. 1A-B) implemented as a connector such as a receptacle 232. A power cable 234 that is connected to plug 236 on one side and plug 238 on the other side may be removably connected to a housing 240 by plugging plug 238 into receptacle 232. Plug 236 may be removably connected to coupling component 152 (in FIGS. 1A-B) of user device 150, which may be implemented as a receptacle corresponding to plug 236. Housing 240 may include various other components of charger device 230, such as power supply components 116, wireless interface 120, and other components of charger device 110 shown in FIGS. 1A-B. Power supply components 116 of charger device 210 may include a power plug or other connector 242 provided on housing 212 to be plugged into an AC power outlet, such as external power source 190 (in FIGS. 1A-B).

As shown in FIG. 2C, charger device 250 may include coupling component 112 (in FIGS. 1A-B) implemented as an inductive coil in a charging plate or dock 252. A power cable 254 may connect, fixedly or removably, to charging plate 252 on one side and connect, fixedly or removeably, to a housing 256 on the other side. Various other components of charger device 250, such as power supply components 116, wireless interface 120, and other components of charger device 110 shown in FIGS. 1A-B may be provided in charging plate 252, housing 256, or distributed between charging plate 252 and housing 256. Power supply components 116 of charger device 250 may include a power plug or other connector 258 provided on housing 256 to be plugged into an AC power outlet, such as external power source 190 (in FIGS. 1A-B).

Charger device 250 may use the inductive coil in charging plate 252 to generate an alternating electromagnetic field. Coupling component 152 of user device 150 (shown in FIGS. 1A-B) may be implemented as a corresponding inductive coil. Accordingly, when inductive coil of user device 150 is coupled to the inductive coil of charger device 250, for example, by placing user device 150 on or near charging plate 252, the inductive coil of user device 150 converts power from the alternating electromagnetic field into electric current to charge a battery such as battery 156 of user device 150 (shown in FIGS. 1A-B).

FIG. 3 illustrates a block diagram of a networked system 300 according to one or more embodiments of the present disclosure.

User device 150 may include any appropriate combination of hardware and/or software, including the various components of user device 150 shown in FIGS. 1A-B. One or more processors 162 may be configured to read and execute instructions stored on memory 164 or tangible non-transitory machine-readable medium 174. In one or more embodiments, user device 150 includes memory 164 and/or non-transitory machine-readable medium 174 that stores instructions that, when executed by one or more processors 162, are adapted to cause user device 150 to perform specific tasks. In some embodiments, the instructions may be executed by one or more processors 162 in response to interaction with user 102. For example, such instructions may include a browser application 352 such as a mobile browser application, which may be used to provide a user interface to permit user 102 to browse information available over network 180, including information hosted by service provider server 130. Browser application 352 may be implemented as a web browser to view information available over network 180. Browser application 352 may include a GUI that is configured to allow user 102 to interface and communicate with service provider server 130 or other servers managed by content providers or merchants via network 180. For example, user 102 may be able to access websites to find and purchase items, as well as access user account information or web content.

User device 150 may also include a charge management application 354 that notifies user 102 to charge user device 150, notifies user 102 that charger device 110 is available, and/or that another user device 150 of user 102 that is plugged into charger device 110 is done charging. Charge management application 354 may determine whether to provide a notification to charge user device 150 based on receiving an "available" signal such as signal 104 (in FIG. 1A) from charger device 110 and/or an amount of power remaining in battery 156 (shown in FIGS. 1A-B. Charge management application 354 may further determine whether to provide a notification based on accessing data in a database 360, which may be stored in memory 164 (in FIGS. 1A-B). For example, charge management application 354 may determine whether to provide the notification based on activity data 364 tracked by motion sensor components 168 (in FIGS. 1A-B), location data 366 determined by location component 170 (in FIGS. 1A-B), and/or other information or data related to user 102 that may be in database 360 and/or received from service provider server 130.

Charge management application 354 may access one or more identifiers 362 in database 360 and transmit at least one of identifiers 362 to charger device 110 to be included in a "done charging" signal such as signal 106 (in FIG. 1B)

indicating user device 150 is done charging, which may be recognized by another user device 150 of user 102. One or more identifiers 362 may include a device identifier such as a universally unique device identifier (UUID), a media access control (MAC) address/number, or other device identifier. In addition, or alternatively, one or more identifiers 362 may include a user identifier, which may be associated with and/or stored in a user account 340 stored in a database 338 of service provider server 130. Charge management application 354 may perform various other operations relating to charge management and notifications relating to charging user device 150 described herein.

User device 150 may also include a payment application 356 that may be utilized by user 102 using user device 150 to make a payment. In some embodiments, payment application 356 may be configured to make a payment using service provider server 130 as a payment processor. In some embodiments, functionalities provided by charge management application 354 and payment application 356 may actually be provided by a single application.

User device 150 may include one or more other applications 358 as may be desired in one or more embodiments to provide additional features available to user 102, including accessing user account 340 stored in a database 338 of service provider server 130. For example, other applications 358 may include interfaces and communication protocols that allow the user to communicate information with service provider server 130 and other online sites via network 180. Other applications 358 may also include security applications for implementing client-side security features, programmatic client applications for interfacing with appropriate application programming interfaces (APIs) over network 180 or various other types of generally known programs and/or applications. Other applications 358 may include mobile applications downloaded and resident on user device 150 that enable user 102 to access content.

Service provider server 130, according to some embodiments, may be maintained by an online service provider, such as PayPal, Inc. of San Jose, Calif., which may provide services related to charge management and notifications relating to charging user device 150. Service provider server 130 may also be capable of processing online financial and information transactions on behalf of user 102. Service provider server 130 may also be capable of providing access to goods and services (collectively referred to as "items") of a merchant or service provider that are for purchase and may provide a payment service processing for the purchased items. Items may include delivering power to charge user devices 150 for a fee using charger devices 110 at a charge station or kiosk.

Service provider server 130 may include a charge management application 332, which may be configured to interact with user device 150 via network 180. In some embodiments, charge management application 332 may maintain information and data related to user 102, such as activity data 342, in user account 340 stored in database 338. Charge management application 332 may determine whether to notify user 102 to charge user device 150 in response to user device 150 receiving "available" signal 104 and based on at least a part of the information and data in user account 340, and/or transmit at least a part of the information and data in user account 340 to user device 150 such that user device 150 may determine whether to notify user 102 to charge user device 150 in response to receiving "available" signal 104. Charge management application 332 may perform various other operations relating to charge management and notifications relating to charging user device 150 described herein.

Service provider server 130 may also include a payment application 334 that may facilitate processing payments, for example, from user 102 to a merchant or service provider. Payment application 334 may be configured to interface with payment application 356 to receive payment details, user information, merchant information, charger device information, and additional information for processing a payment on behalf of user 102. In some embodiments, payment application 334 may also be capable of interfacing with charger device 110 at a charge station or kiosk such that when user device 150 is coupled to charger device 110, a payment may be authorized for use of charger device 110 to which user device 150 is coupled. In some embodiments, functionalities provided by charge management application 332 and payment application 334 may actually be provided by a single application.

Service provider server 130 may also include a database 338 that includes user accounts 340 including account information for users having an account with the service provider, such as user 102. In some embodiments, payment application 334 may process payments based on account information in user account 340 of database 338. Service provider server 130 may include other applications 336 and may also be in communication with one or more external databases (not shown), that may provide additional information to be used by service provider server 130. In some embodiments, the one or more external databases may be databases maintained by third parties, and may include third party account information of user 102.

Figure 4A:
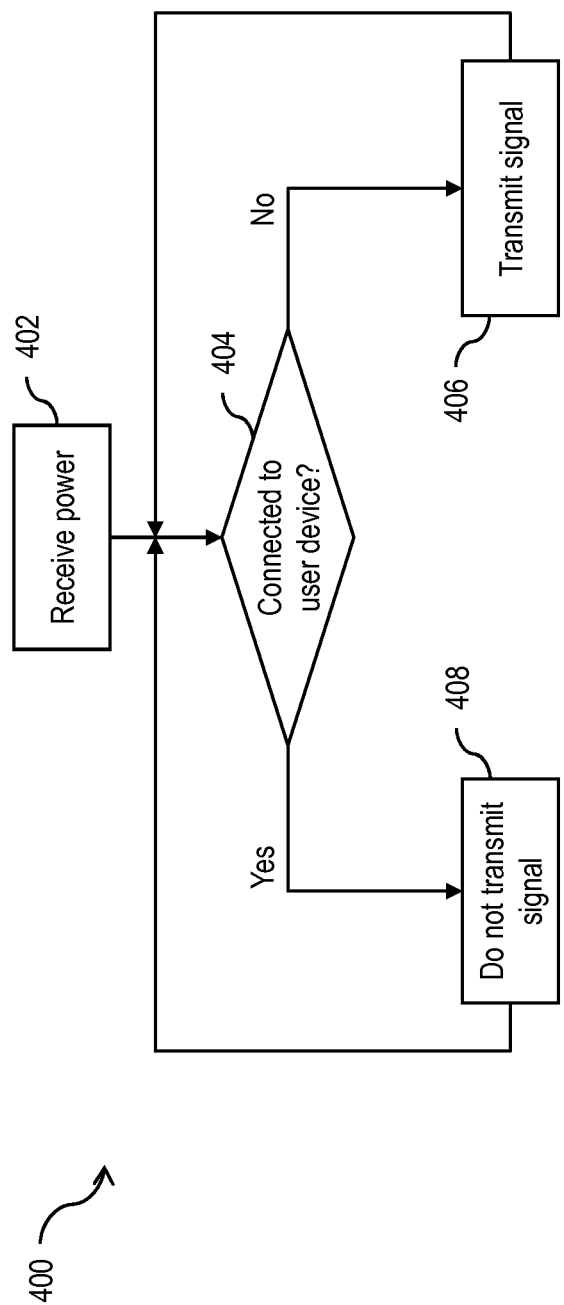

FIG. 4A illustrates a flow diagram of a process 400 for broadcasting signals such as signal 104 (in FIG. 1A) by a charger device such as charger device 110 (in FIGS. 1A-B), according to one or more embodiments of the present disclosure.

At block 402, charger device 110 receives power from an external power source such as external power source 190 (in FIGS. 1A-B). For example, a user such as user 102 (in FIGS. 1A-B) may connect charger device 110 (e.g., by plugging in plug 218, 242, or 258 in FIGS. 2A-C) to an AC power outlet.

At block 404, charger device 110 determines whether charger device 110 (e.g., using coupling component 112 in FIGS. 1A-B) is connected to or otherwise coupled to a user device such as user device 150 (in FIGS. 1A-B).

In some embodiments, coupling component 112 includes a connector (e.g., plug 212 or receptacle 242 in FIGS. 2A-B), and charger device 110 may determine that coupling component 112 is connected to user device 150 when plug 212 is plugged into a corresponding receptacle of user device 150 or receptacle 242 is connected to user device 150 (e.g., using a power cable such as power cable 234 and a plug such as plug 236 and 238 in FIG. 2B). For example, charger device 110 may determine a connection such as connection 108 (in FIG. 1B) by detecting a power draw by user device 150 or an increased current flow. In another example, charger device 110 may determine connection 108 by detecting contact with user device 150 using a physical button or switch provided on plug 212, receptacle 232, or plug 236.

In other embodiments, coupling component 112 includes an inductive coil in a charging plate 252, and charger device may determine that coupling component 112 is wirelessly coupled to user device 120 when user device 150 including a corresponding inductive coil is placed on or near charging plate 252. For example, charger device 110 may determine a coupling such as coupling 108 (in FIG. 1B) by detecting user device 150 is within a charging range of charger device 110 using wireless communications, such as Bluetooth® communication, radio-frequency identification (RFID) communication, or other communication that may be used to determine or estimate distance between two devices. In another example, charger device 110 may include a proximity sensor to determine coupling 108. In a further example, charger device 110 may determine coupling 108 by detecting a power draw by user device 150 or change in current flow through the inductive coil. In a further example, charger device 110 may determine coupling 108 by detecting contact with user device 150 using a physical button or switch provided on charging plate 252.

At block 406, charger device 110 broadcasts or otherwise transmits (e.g., via wireless interface 120 in FIGS. 1A-B) an "available" signal such as signal 104 (in FIG. 1A) indicating charger device 110 is available in response to determining that charger device 110 is not connected to or otherwise coupled to user device 150. For example, "available" signal 104 may include a message indicating charger device 110 is available and/or a timestamp.

In some embodiments, charger device 110 may broadcast or otherwise transmit "available" signal 104 indicating charger device 110 is available and also the location of charger device 110 in response to determining that charger device 110 is not connected to or otherwise coupled to user device 150. For example, "available" signal 104 may include a message indicating charger device 110 is available, the location data, and/or a timestamp. Charger device 110 may have received location data such as location data 366 (in FIG. 3) from user device 150 while it was previously connected to or otherwise coupled to user device 150 and have stored location data 366 in a memory such as memory 124 (in FIGS. 1A-B). Alternatively, location data may be determined by a location component such as a GPS included in charger device 110, or may be provided by a user such as user 102 (in FIGS. 1A-B) (e.g., via user device 150).

At block 408, charger device 110 (e.g., via wireless interface 120) does not broadcast "available" signal 104 in response to determining that charger device 110 (e.g., using coupling component 112) is connected to or otherwise coupled to user device 150.

In an example, when user 102 connects charger device 110 (e.g., by plugging in plug 218, 242, or 258 in FIGS. 2A-C) to an AC outlet, charger device starts broadcasting "available" signal 104 and continues broadcasting "available" signal 104 while charger device 110 is not connected to or otherwise coupled to user device 150. When user 102 connects charger device 110 (e.g., by plugging in plug 212 or 236 in FIGS. 2A-B) to user device 150, charger device 110 stops broadcasting the "available signal." When user 102 subsequently disconnects charger device 110 (e.g., by unplugging plug 212 or 236) from user device 150, which may be after user device 150 is done charging or only partially charged, charger device 110 resumes broadcasting "available" signal 104, as shown in block 406.

FIG. 4B illustrates another flow diagram of a process 410 for broadcasting signals by a charger device, such as charger device 110 in FIGS. 1A-B, according to one or more embodiments of the present disclosure.

At block 412, charger device 110 receives power, as described above at block 402.

At block 414, charger device 110 determines whether charger device 110 (e.g., using coupling component 112 in FIGS. 1A-B) is connected to or otherwise coupled to a user device such as user device 150 (in FIGS. 1A-B), as described above at block 404.

At block 416, charger device 110 broadcasts or otherwise transmits (e.g., via wireless interface 120 in FIGS. 1A-B) an "available" signal such as signal 104 (in FIG. 1A) in response to determining that charger device 110 is not connected to or otherwise coupled to user device 150, as described above at block 406.

At block 418, charger device 110 (e.g., via wireless interface 120) does not broadcast or otherwise transmit "available" signal 104 in response to determining that charger device 110 is connected to or otherwise coupled to user device 150 while a battery such as battery 156 (in FIGS. 1A-B) of user device 150 is being charged.

At block 420, charger device 110 determines whether user device 150 is done charging while still connected to or otherwise coupled to user device 150. In response to determining a battery such as battery 156 (in FIGS. 1A-B) of user device 150 is still being charged, charger device 110 does not transmit "available" signal, as shown at block 418. In response to determining battery 156 of user device 150 is done being charged, charger device 110 transmits "available" signal, as shown at block 416.

In one or more embodiments, battery 156 may be done being charged when battery 156 is fully charged. Alternatively, to extend the life of battery 156 and to optimize battery health, battery 156 may be done being charged when it is charged to a certain amount, which may be a variable amount based on the state or age of battery 156 or a fixed amount (e.g., 80%).

In some embodiments, charger device 110 may determine that battery 156 of user device 150 is done being charged, for example, by detecting a decrease or stop in power draw by user device 150, detecting a decrease or stop in current flow, or no longer detecting contact with user device 150 using a physical button or switch provided on plug 212, receptacle 232, plug 236, or charging plate 252 (in FIGS. 2A-C). In other embodiments, charger device 110 may receive a communication from user device 150 indicating user device 150 is done charging via data interface 114 (in FIGS. 1A-B) of coupling component 112. In a further embodiment, charger device 110 may receive a wireless communication from user device 150 indicating user device 150 is done charging via wireless interface 120.

In an example, when user 102 connects charger device 110 (e.g., by plugging in plug 218, 242, or 258 in FIGS. 2A-C) to an AC outlet, charger device starts broadcasting "available" signal 104 and continues broadcasting "available" signal 104 while charger device 110 is not connected to or otherwise coupled to user device 150. When user 102 connects charger device 110 (e.g., by plugging in plug 212 or 236 in FIGS. 2A-B) to user device 150, charger device 110 stops broadcasting the "available signal." When user device 150 is done charging, charger device 110 resumes broadcasting "available" signal 104. When user 102 subsequently disconnects charger device 110 (e.g., by unplugging plug 212 or 236) from user device 150, charger device 110 continues broadcasting "available" signal 104, as shown in block 416.

Figure 5:
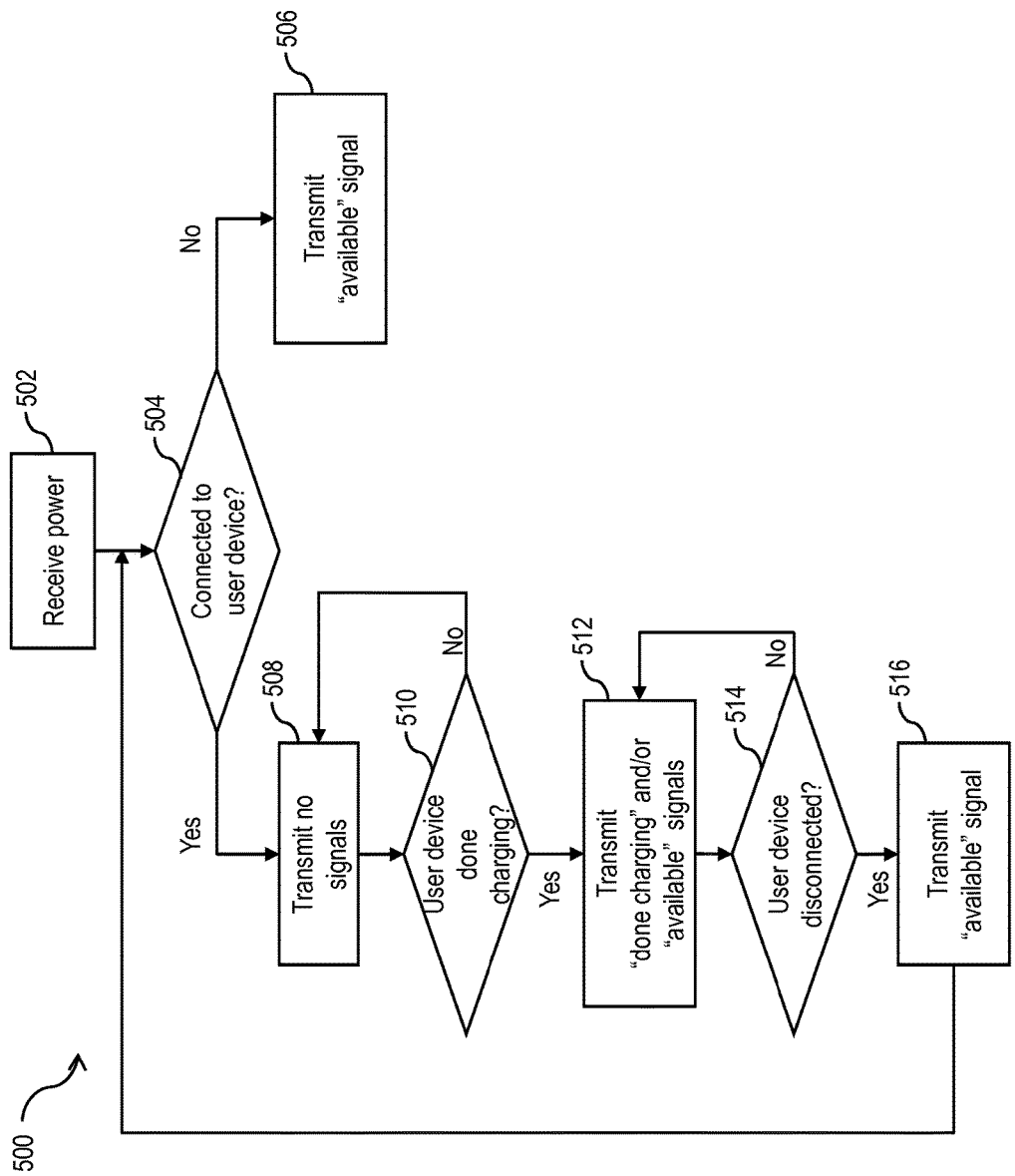
FIG. 5 illustrates a flow diagram of a process for broadcasting two or more types of signals by a charger device according to one or more embodiments of the present disclosure.

FIG. 5 illustrates a flow diagram of a process 500 for broadcasting two or more types of signals such as one or more signals 104, 106 (in FIGS. 1A-B) by a charger device such as charger device 110 (in FIGS. 1A-B), according to one or more embodiments of the present disclosure.

At block 502, charger device 110 receives power, as described above at 402.

At block 504, charger device 110 determines whether charger device 110 (e.g., using coupling component 112 in FIGS. 1A-B) is connected to or otherwise coupled to a user device such as user device 150a (in FIGS. 1A-B), as described above at block 404.

At block 506, charger device 110 broadcasts or otherwise transmits (e.g., via wireless interface 120 in FIGS. 1A-B) an "available" signal such as signal 104 (in FIG. 1A) in response to determining that charger device 110 is not connected to or otherwise coupled to user device 150a, as described above at block 406.

At block 508, charger device 110 (e.g., via wireless interface 120) does not broadcast or otherwise transmit "available" signal 104 in response to determining that charger device 110 is connected to or otherwise coupled to user device 150a while user device 150a is charging.

At block 510, charger device 110 determines whether user device 150a is done charging while still connected to or otherwise coupled to user device 150a. In response to determining user device 150a is still charging, charger device 110 (e.g., via wireless interface 120) does not broadcast or otherwise transmit "available" signal 104, as shown at block 508.

At block 512, in response to determining user device 150a is done charging while still connected to or otherwise coupled to user device 150a, charger device 110 (e.g., via wireless interface 120) broadcasts or otherwise transmits a "done charging" signal such as signal 106 (in FIG. 1B) that includes an identifier such as identifier 362 (e.g., a device identifier or user identifier) received from user device 150a indicating that user device 150a is done charging. For example, "done charging" signal 106 may include a message indicating user device 150 is done charging, at least one of identifiers 362, and/or a timestamp. In some embodiments, in response to determining user device 150a is done charging, charger device 110 (e.g., via wireless interface 120) broadcasts or otherwise transmits "done charging" signal 106 and also "available" signal 104. A process for generating and transmitting "done charging" signal 106 is further described below in relation to FIG. 6.

In one or more embodiments, another user device of user 102 such as user device 150b (in FIGS. 1A-B) may receive "done charging" signal 106 and notify user 102 that user device 150a is done charging, such as by providing a notification to user 102 on a display such as display 166 (in FIGS. 1A-B) of user device 150b. In some embodiments, user device 150a may be paired to, bonded to, linked with, or otherwise associated with user device 150b. During initial pairing (e.g., Bluetooth® initial pairing or bonding), user device 150a and user device 150b may each share its identifier 362, such as a device identifier (e.g., a UUID or MAC address/number), to the other device, and each device may store identifier 362 of the other device in its database 360. For example, user device 150a may store identifier 362 of user device 150b in its database 360 and user device 150b may store identifier 362 of user device 150a in its database 360. When user device 150b receives "done charging" signal 106, user device 150b may recognize identifier 362 contained in "done charging" signal 106 as identifier 362 of user device 150a previously stored in database 360 of user device 150b during pairing of user device 150a and 150b. When user 102 receives the notification, user 102 is alerted that user device 150a is done charging and may go disconnect or otherwise uncouple user device 150a from charger device 110.

At block 514, charger device 110 determines whether charger device 110 (e.g., using coupling component 112 in FIGS. 1A-B) is disconnected from or otherwise uncoupled from user device 150a, similarly as described above at block 402.

In some embodiments, coupling component 112 includes a connector (e.g., plug 212 or receptacle 242 in FIGS. 2A-B), and charger device 110 may determine that coupling component 112 is disconnected from user device 150 when 212 or 236 (in FIGS. 2A-B) is unplugged from a corresponding receptacle of user device 150 or receptacle 242 is disconnected from user device 150 (e.g., using a power cable such as power cable 234 and a plug such as plug 236 and 238 in FIG. 2B). For example, charger device 110 may determine a connection such as connection 108 (in FIG. 1B) is disconnected by detecting a stopped or decreased power draw or a stopped or decreased current flow. In another example, charger device 110 may determine connection 108 is disconnected by detecting removal of contact with user device 150 using a physical button or switch provided on plug 212, receptacle 232, or plug 236.

In other embodiments, coupling component 112 includes an inductive coil in a charging plate 252, and charger device may determine that coupling component 112 is decoupled from user device 120 when user device 150 including a corresponding inductive coil is removed from on or near charging plate 252. For example, charger device 110 may determine a coupling such as coupling 108 (in FIG. 1B) is decoupled by detecting user device 150 is removed from a charging range of charger device 110 using wireless communications, such as Bluetooth® communication, RFID communication, or other communication that may be used to determine or estimate distance between two devices. In another example, charger device 110 may include a proximity sensor to determine coupling 108 is decoupled. In a further example, charger device 110 may determine coupling 108 is decoupled by detecting a stopped or decreased in power draw or change in current flow through the inductive coil. In a further example, charger device 110 may determine coupling 108 is decoupled by detecting removal of contact with user device 150 using a physical button or switch provided on charging plate 252.

At block 516, in response to determining charger device 110 (e.g., using coupling component 112) is no longer connected to or otherwise coupled to user device 150a, charger device 110 (e.g., via wireless interface 120) may broadcast or otherwise transmit "available" signal 104 and no longer broadcast or otherwise transmit "done charging" signal 106.

In response to determining charger device 110 (e.g., using coupling component 112) is still coupled to user device 150 that is done charging, charger device continues transmitting "done charging" signal 106 and/or "available" signal 104, as shown at block 512.

Figure 6:
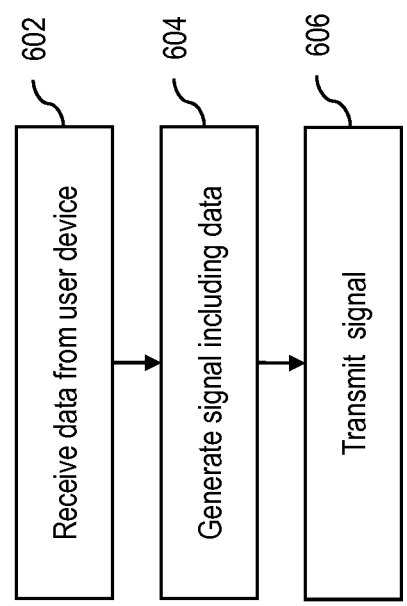
FIG. 6 illustrates a flow diagram of a process for generating and transmitting signals according to one or more embodiments of the present disclosure.

FIG. 6 illustrates a flow diagram of a process for generating and transmitting a signal by a charger device such as charger device 110 (in FIGS. 1A-B) according to one or more embodiments of the present disclosure.

At block 602, charger device 110 may receive data from a user device such as user device 150a (in FIGS. 1A-B) while charger device 110 is connected to or otherwise coupled to user device 150a. In some embodiments, charger device 110 may request an identifier such as identifier 362 (e.g., a device identifier or user identifier) from user device 150a at the time charger device 110 is connected to or otherwise coupled to user device, when user device 150a is done charging, or anytime in between. Charger device 110 may receive identifier 362 from user device 150a via a data interface such as data interface 114 (in FIGS. 1A-B)

included in a coupling component such as coupling component 112 (in FIGS. 1A-B) used to connect charger device 110 to user device 150. Alternatively, charger device 110 may receive identifier 362 from user device 150a through wireless communications via a wireless interface such as wireless interface 120 (in FIGS. 1A-B).

At block 604, charger device 110 generates a "done charging" signal such as signal 106 in FIG. 1B that includes identifier 362 received from user device 150a.

At block 604, charger device 110 broadcasts or otherwise transmits "done charging" signal 106 indicating user device 150a is done charging, as described above at block 512.

Figure 7:
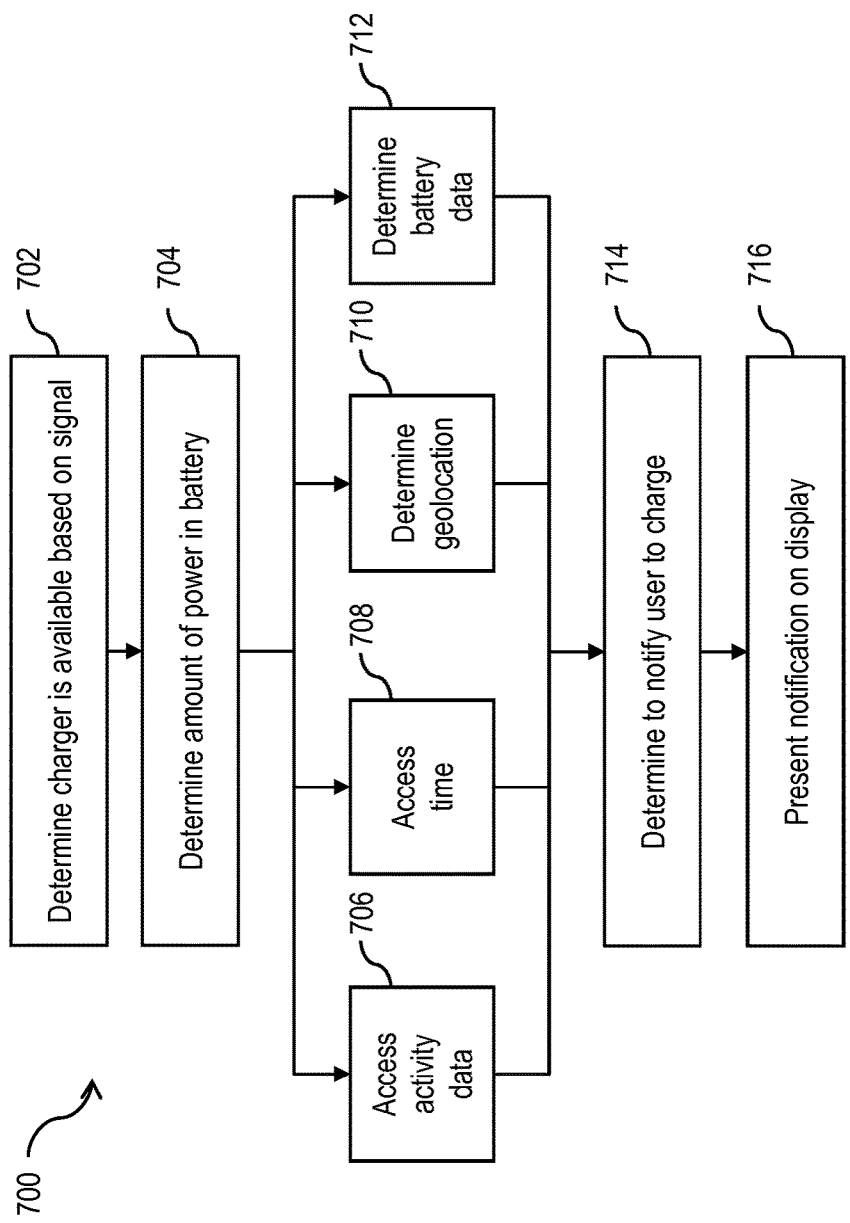
FIG. 7 illustrates a flow diagram of a process for notifying a user to charge a user device according to one or more embodiments of the present disclosure.

FIG. 7 illustrates a flow diagram of a process 700 for notifying a user such as user 102 (in FIGS. 1A-B) to charge a user device such as user device 150 (in FIGS. 1A-B) using a charger device such as charger device 110 (in FIGS. 1A-B) according to one or more embodiments of the present disclosure.

At block 702, a service provider server such as service provider server 130 (in FIGS. 1A-B and FIG. 3) or user device 150 determines that charger device 110 is available in response to user device 150 receiving an "available" signal such as signal 104 (in FIG. 1A). In one or more embodiments, user device 150 may determine charger device 110 is available in response to receiving "available" signal 104. In some embodiments, user device 150 may communicate that charger device 110 is available to service provider server 130 in response to receiving "available" signal 104. Based on such communication, service provider server 130 may determine charger device 110 is available in response to user device 150 receiving "available" signal 104.

At block 704, service provider server 130 or user device 150 determines an amount of power in a battery such as battery 156 (in FIGS. 1A-B). In one or more embodiments, user device 150 may determine an amount of power left in a battery, for example, by using a coulomb counter to measure the amount of charge (e.g., in ampere hour, Ah) delivered or stored by battery 156 to monitor the amount of power left, by measuring the internal impedance of battery 156 to determine open circuit voltage used to calculate the amount of power left, and/or by other processes for determining the amount of power left. In some embodiments, user device 150 may communicate the amount of power left in battery 156 to service provider server 130 as part of the communication indicating charger device 110 is available at block 706 or in a separate communication. Based on such communication, service provider server 130 may determine the amount of power left in battery 156, which may also be in response to user device 150 receiving "available" signal 104.

At block 706, service provider server 130 or user device 150 may access activity data, such as activity data 342 in database 338 of service provider server 130 or activity data 364 in database 360 of user device 150 in response to user device 150 receiving "available" signal 104. In one or more embodiments, user device 150 may detect movement of user 102 to generate activity data 364 and store activity data in database 360 of user device. In some embodiments, user device 150 may transmit activity data 364 to service provider server 130 to be stored as activity data 342 in user account 340 in database 338. User device 150 may transmit activity data 364 to service provider server 130 by syncing activity data 364 with activity data 342. Alternatively, user device 150 may transmit activity data 364 to service provider server 130 by periodically transmitting activity data 364 and/or by transmitting activity data 364 in response to receiving "available" signal 104.

In one or more embodiments, user device 150 may access activity data 342 in database 338 in response to receiving "available" signal 104. In other embodiments, service provider server 130 may access activity data 342 in database 338 of service provider server 130 and/or activity data 364 in database 360 of user device 150 in response user device 150 to receiving "available" signal 104.

Activity data 364 or 342 may include recent activity indicating whether user 102 has been active and/or how active user 102 has been recently (e.g., in the past 5 minutes). Activity data 364 or 342 may also include activity history indicating whether user 102 is usually active at a certain time of day in general or whether user 102 is usually active at a certain time of day on certain days of the week.

At block 708, service provider server 130 or user device 150 may access a current time in response to user device 150 receiving "available" signal 104.

At block 710, service provider server 130 or user device 150 may determine a geolocation of user device 150 in response to user device 150 receiving "available" signal 104. In one or more embodiments, user device 150 may use a location component such as location component 170 to determine the geolocation, which may be stored in database 360 as location data 366. In some embodiments, user device 150 may provide service provider server 130 with access to the geolocation determined by location component 170 and/or communicate the geolocation to service provider server 130 as part of the communication indicating charger device 110 is available at block 706 or in a separate communication. Based on such access or communication, service provider server 130 may determine the geolocation of user device 150 in response to user device 150 receiving "available" signal 104.

At block 712, service provider server 130 or user device 150 may determine battery data including battery usage data and/or other battery-related data for a battery such as battery 156 of user device 150 in response to user device 150 receiving "available" signal 104. In one or more embodiments, user device 150 may include a battery management system and may access battery data from battery management system. In some embodiments, user device 150 may communicate the battery data to service provider server 130 as part of the communication indicating charger device 110 is available at block 706 or in a separate communication. Based on such communication, service provider server 130 may determine the battery data in response to user device 150 receiving "available" signal 104.

At block 714, service provider server 130 or user device 150 determines whether to notify user 102 to charge user device 150 based on user device 150 receiving "available" signal, the amount of power remaining in battery 156, activity data 364 or 342, time (e.g., time of the day or week), and/or geolocation. Service provider server 130 or user device 150 determines whether to notify user 102 to charge user device 150 further based on other conditions and/or factors.

For example, service provider server 130 or user device 150 may decide to notify user 102 to charge user device 150 when charger device 110 is available and the amount of power remaining in battery 156 is low.

In another example, service provider server 130 or user device 150 may decide to notify user 102 to charge user device 150 when charger device 110 is available, the amount of power remaining in battery 156 is low, and activity data 364 or 342 indicates user 102 has not been active recently (e.g., within the past 5 minutes). When user 102 has not been active recently, such as when user 102 is lounging and watching television, user 102 presumably does not need user device 150 at the moment.

In a further example, service provider server 130 or user device 150 may decide to notify user 102 to charge user device 150 when charger device 110 is available, the amount of power remaining in battery 156 is low, activity data 364 or 342 indicates user 102 has not been active recently, and further activity data 364 or 342 indicates user 102 is usually not active at the time of the day or week.

In yet another example, service provider server 130 or user device 150 may determine user device 150 requires charging by forecasting how much power user device 150 requires to get through the day (e.g., until night time when user 102 usually gets home) or to get through a time period in which user 102 does not have access to charger device 110, such as during a commute (e.g., from home to work or vice versa), based on the battery usage data. Service provider server 130 or user device 150 may decide to notify user 102 to charge user device 150 when charger device 110 is available and user device 150 requires charging based on the battery usage data.

Service provider server 130 or user device 150 may determine whether to notify user 102 to charge user device 150 in response to other combinations of such conditions and/or factors.

At block 716, user device 150 presents a notification on a display such as display 166 (in FIGS. 1A-B). The notification may include a message prompting user 102 to charge user device 150 and/or indicate charger device 110 is available. In some embodiments, the notification may include a distance to charger device 110. User device 150 may determine the distance between user device 150 and charger device 110 based on "available" signal 104 (e.g., using a timestamp included in "available" signal 104). In further embodiments, the notification may further include a geolocation of charger device 110 (e.g., presented on a map).

Figure 8:
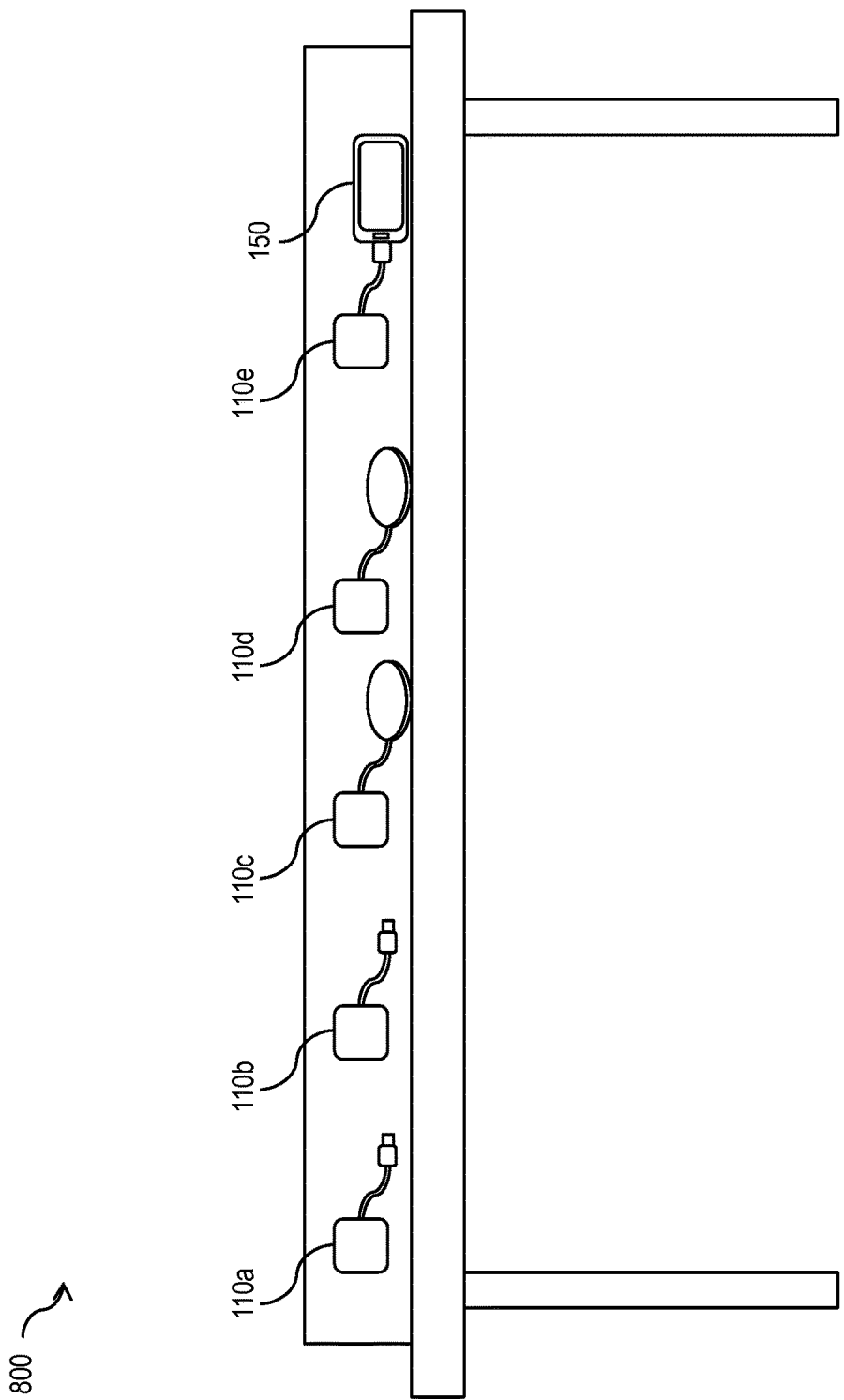
FIG. 8 illustrates a charge station or kiosk including multiple charger devices according to one or more embodiments of the present disclosure.

FIG. 8 illustrates a charge station or kiosk 800 including multiple charger devices 110a-e according to one or more embodiments of the present disclosure.

In one or more embodiments, charging station 800 may be provided at various public or private locations including an airport, a hotel, a restaurant, a store, a department store, a park, a camp, an airplane, a bus, a school, an office, a fitness center, or other location where one or more users, such as users 102 (in FIGS. 1A-B), may want to charge their user devices such as user device 150 (in FIGS. 1A-B). Conventional charge stations that charge for use of charger devices include a payment device, such as a credit card or bill acceptor for accepting payment. Charging station 800 does not require such a payment device, as each of charger devices 110a-e is configured to interact with user device 150 to allow service provider server 130 to process payment for providing power for charging user device 150.

In some embodiments, charger device 110e transmits to user device 150 a charger device identifier to user device 150 via a data interface such as data interface 154 (in FIGS. 1A-B). User device 150 may transmit the charger device identifier and an identifier such as identifier 362 (e.g., a device identifier or user identifier) from user device 150 to service provider server 130. The charger device identifier may be associated with an account of a merchant or service provider that is charging fees for providing power through charger devices 110a-e. Identifier 362 may be associated with user account 340 in database 338 of service provider server 130. Service provider server 130 may process a payment from user account 340 to the account of the merchant or service provider using the charger device identifier and identifier 362.

In other embodiments, charger device 110e receives identifier 362 from user device 150 and transmits identifier 362 and a charger device identifier to service provider server 130 over network 180. Service provider server 130 may process a payment from user account 340 to the account of the merchant or service provider using the charger device identifier and identifier 362.

Figure 9:
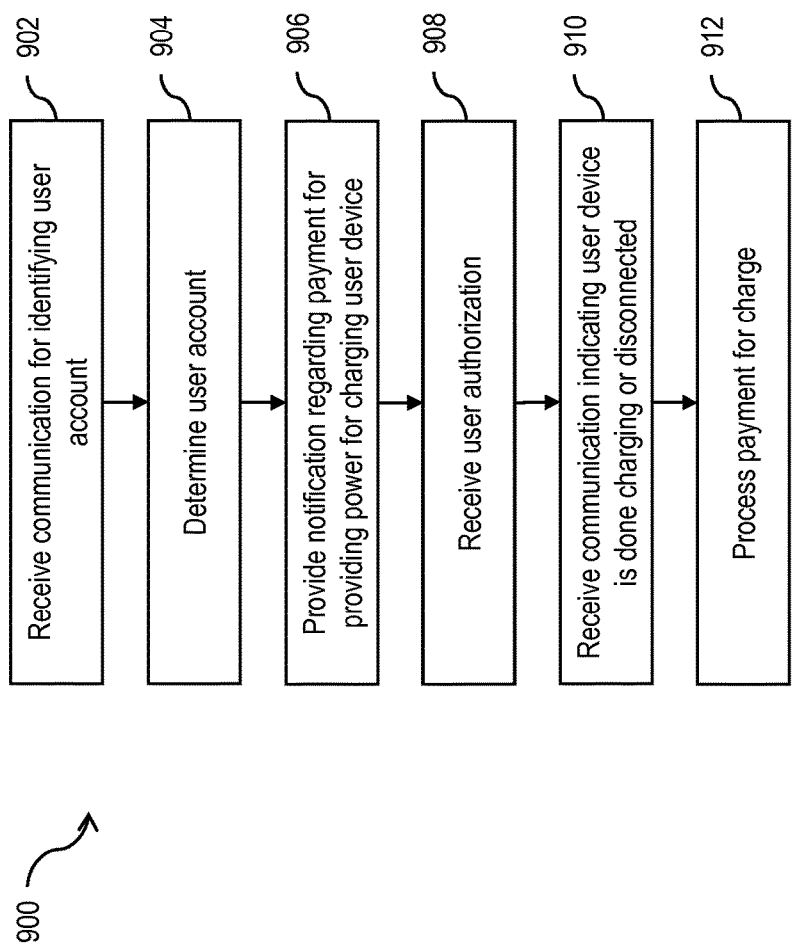
FIG. 9 illustrates a flow diagram of a process for processing a payment for charging a user device by a charger device according to one or more embodiments of the present disclosure.

FIG. 9 illustrates a flow diagram of a process for processing a payment for charging a user device such as user device 150 (in FIGS. 1A-B) of a user such as user 102 (in FIGS. 1A-B) by a charger device such as charger device 110 (in FIGS. 1A-B) according to one or more embodiments of the present disclosure.

At block 902, service provider server 130 may receive from charger device 110 or user device 150, via network 180, a communication including an identifier such as identifier 362 (e.g., a device identifier or user identifier) and a charger device identifier, as described above in relation to FIG. 8.

At block 904, service provider server 130 may determine a user account such as user account 340 of user 102 based on identifier 362. For example, identifier 362 may be a user identifier associated with user account 340. Service provider server 130 may also determine an account of a merchant or service provider that is to receive the payment for providing power through charger device 110 for charging user device 150 based on charger device identifier. For example, charger device identifier may be associated with the account of the merchant or service provider.

At block 906, service provider server may transmit to user device a notification regarding payment for providing power for charging user device 150. For example, the notification may indicate the fee per time charger device 110 is used, or the fee per amount of charge (e.g., in Ah) delivered, or a fee for fully charging user device 150. When the notification is displayed on user device, it may include an accept button or other GUI elements that user 102 may interact with to authorize or decline payment for charging user device 150.

At block 908, service provider server 130 may receive an authorization from user 102 in response to user 102 providing authorization on user device 150, such as by touching the accept button in the notification.

At block 910, service provider server 130 receives from charger device 110 or user device 150, via network 180, a communication indicating user device 150 is done charging or has been disconnected.

At block 912, service provider server 130 processes payment from user account 140 to the account of the merchant or service provider for providing power to user device 150 based on the fee authorized by user 102 and/or the amount of charge provided to user device 150.

Figure 10:
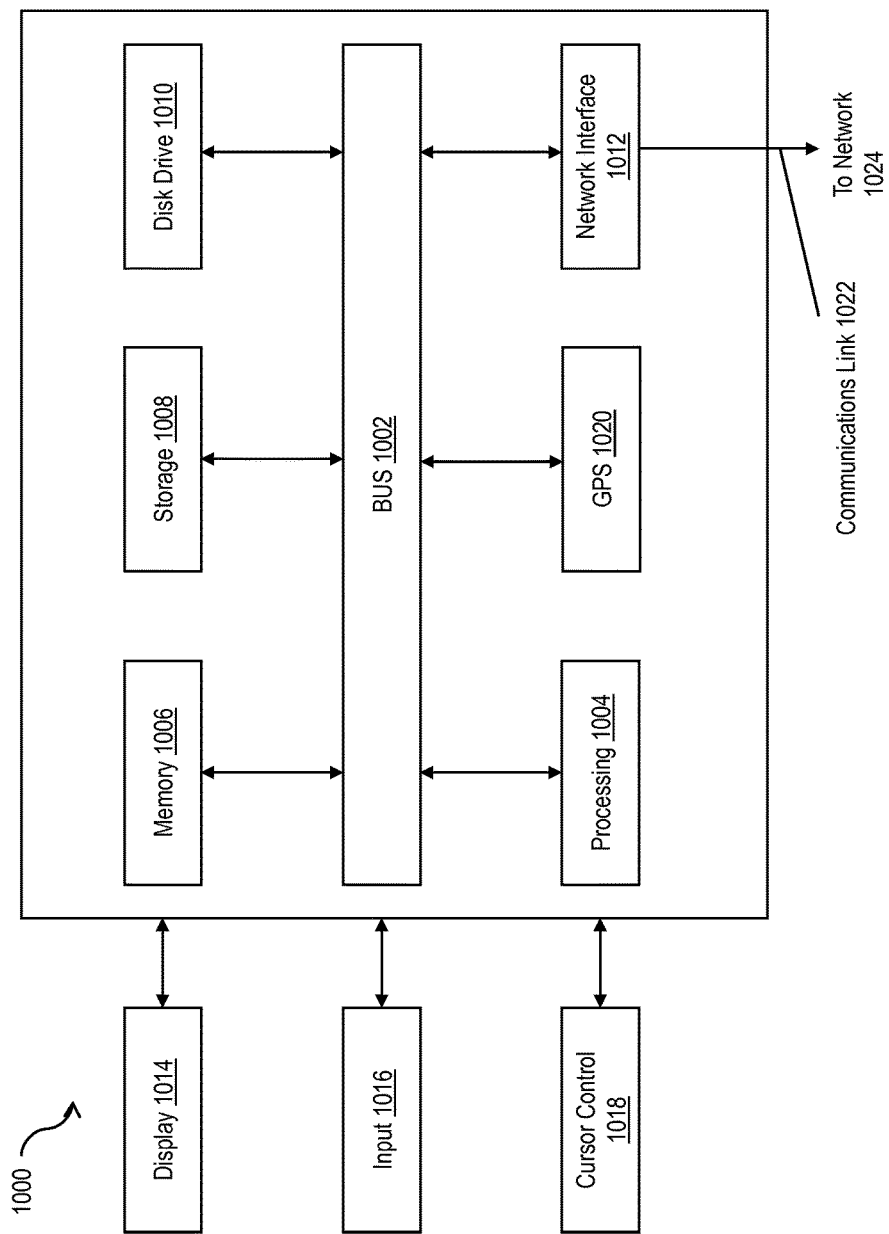
FIG. 10 illustrates a block diagram of a system for implementing one or more components in FIGS. 1A-B and FIG. 3 according to one or more embodiments of the present disclosure.

FIG. 10 illustrates a block diagram of a computer system 1000 for implementing, for example, a charger device such as charger device 110, service provider server such as service provider server 130, and one or more user device such as one or more user devices 150 in FIGS. 1A-B and FIG. 3, according to one or more embodiments of the present disclosure. It should be appreciated that other devices utilized by users, service providers, and/or merchants in the system discussed above may be implemented as computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., LED display component, OLED display component, LCD component, PDP component, CRT display component, or other display component), an input component 1016 (e.g., keyboard, keypad, virtual keyboard, touchscreen, etc.), a cursor control component 1018 (e.g., mouse, pointer, trackball, etc.), and/or a location determination component 1020 (e.g., a GPS device as illustrated, a cell tower triangulation device, and/or a variety of other location determination devices known in the art). In one implementation, disk drive component 1010 may include a database having one or more disk drive components.

In accordance with various embodiments of the present disclosure, computer system 1000 performs specific operations by processing component 1004 executing one or more sequences of instructions contained in memory component 1006, such as described herein with respect to charger device 110, service provider server 130, and one or more user devices 150. Such instructions may be read into system memory component 1006 from another computer readable medium, such as static storage component 1008 or disk drive component 1010. In other embodiments, hard-wired circuitry may be used in place of, or in combination with, software instructions to implement the present disclosure.

Logic may be encoded in a computer readable medium, which may refer to any medium that participates in providing instructions to processing component 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 1010, volatile media includes dynamic memory, such as system memory component 1006, and transmission media includes coaxial cables, copper wire, and fiber optics, including wires that comprise bus 1002. In one example, transmission media may take the form of acoustic or light waves, such as those generated during radio wave and IR data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 1000. In various other embodiments of the present disclosure, a plurality of computer systems 1000 coupled by a communication link 1022 to a network 1024 such as network 180 in FIGS. 1A-B and FIG. 3 (e.g., a LAN, WLAN, PTSN, and/or various other wired or wireless networks, including telecommunications, mobile, and cellular phone networks) may perform instruction sequences to practice the present disclosure in coordination with one another.

Computer system 1000 may transmit and receive messages, data, information and instructions, including one or more programs (i.e., application code) through communication link 1022 and network interface component 1012. Network interface component 1012 may include an antenna, either separate or integrated, to enable transmission and reception via communication link 1022. Received program code may be executed by processing component 1004 as received and/or stored in disk drive component 1010 or some other non-volatile storage component for execution.

In view of the present disclosure, it will be appreciated that various devices, systems, and methods have been described according to one or more embodiments relating to electronic charging devices configured to communicate with other devices by broadcasting signals.

Although various components and steps have been described herein as being associated with charger device 110, service provider server 130, and one or more user devices 150 of FIGS. 1A-B and FIG. 3, it is contemplated that the various aspects of such devices and servers illustrated in FIGS. 1A-B and FIG. 3 may be distributed among a plurality of servers, devices, and/or other entities.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A charger device comprising:
a coupling component configured to deliver power to a user device, wherein the coupling component comprises at least one of a connector configured to plug into the user device or an inductive coil configured to inductively couple to the user device, wherein the coupling component further comprises a data interface configured to communicate data with the user device;
a wireless interface configured to transmit signals;
a non-transitory memory; and
one or more hardware processors coupled with the non-transitory memory and configured to read instructions from the non-transitory memory to cause the charger device to perform operations comprising:
in response to determining that the coupling component is not coupled to any user device, broadcasting via the wireless interface a first signal indicating the charger device is available, wherein the first signal includes location information of the charger device;
detecting that a first user device is coupled to the charger device via the coupling component;
receiving, from the first user device via the data interface, an identifier of the first user device; and
in response to determining that the charger device has charged the first user device to a predetermined level less than a fully charged level, (i) transmitting, to a second user device determined based on the identifier of the first user device, a second signal indicating the first user device is charged and (ii) broadcasting, via the wireless interface, a third signal indicating that the charging device is available.

2. The charger device of claim 1, wherein the first signal causes the first user device to provide a notification to charge to a user of the first user device.

3. The charger device of claim 1, wherein the wireless interface is configured to transmit at least one of Bluetooth signals, Wi-Fi signals, infrared (IR) signals, visible light signals, or radio frequency (RF) signals.

4. The charger device of claim 1, wherein the operations further comprise aborting a transmission of the first signal in response to determining the coupling component is coupled to the first user device.

5. The charger device of claim 1, wherein the third signal includes the location information of the charging device.

6. The charger device of claim 1,
wherein the second signal includes the identifier of the first user device.

7. A method comprising:
in response to determining that a charger device is not coupled to any user device, transmitting, by one or more hardware processors, via a wireless interface of the charger device a first signal indicating the charger device is available, wherein the first signal includes location information of the charger device;
detecting, by the one or more hardware processors, that the charger device is coupled to a first user device via a coupling component of the charger device, wherein the coupling component comprises at least one of a connector configured to plug into the first user device or an inductive coil configured to inductively couple the charger device to the first user device, wherein the coupling component further comprises a data interface configured to communicate data with the first user device;
receiving, by the one or more hardware processors via the data interface from the first user device, an identifier of the first user device; and
in response to determining that the user device has been charged to a predetermined level below a fully charged level, (i) transmitting, via the wireless interface to a second user device determined based on the identifier of the first user device, a second signal indicating the first user device is charged and (ii) broadcasting, via the wireless interface, a third signal indicating that the charging device is available.

8. The method of claim 7, further comprising:
determining an amount of power remaining in a battery of the first user device;
determining whether the first user device is in need of charging based, at least in part, on the first user device receiving the first signal and the amount of power remaining in the battery; and
in response to a determination that the first user device is in need of charging, providing a notification on the first user device indicating a need of charging.

9. The method of claim 7, further comprising in response to determining the charger device is coupled to the first user device, aborting a transmission of the first signal.

10. The method of claim 7, wherein the third signal includes the location information of the charger device.

11. The method of claim 7,
wherein the second signal includes the identifier of the first user device.

12. The method of claim 8, further comprising generating activity data of a user associated with the first user device based on sensor data obtained from the first user device, wherein determining whether the first user device is in need of charging is further based on the activity data, and wherein the activity data indicates whether the user has been active during a first time period.

13. The method of claim 8, further comprising determining, via a global positioning system (GPS) of the first user device, a geolocation of the first user device, wherein determining whether the first user device is in need of charging is further based on the geolocation.

14. The method of claim 8, further comprising determining battery usage data for the battery, wherein determining whether the first user device is in need of charging is further based on the battery usage data.

15. The method of claim 7, wherein the wireless interface is configured to transmit at least one of Bluetooth signals, Wi-Fi signals, infrared (IR) signals, visible light signals, or radio frequency (RF) signals.

16. The method of claim 7, further comprising determining the predetermined level based on an estimated age of the battery.

17. A non-transitory machine readable medium having stored thereon machine-readable instructions executable to cause a charger device to perform operations comprising:
in response to determining that the charger device is not coupled to any user device, transmitting via a wireless interface of the charger device a first signal indicating the charger device is available, wherein the first signal includes location information of the charger device;
subsequent to transmitting the first signal, detecting that the charger device is coupled to a first user device via a coupling component of the charger device, wherein the coupling component comprises at least one of a connector configured to plug into the first user device or an inductive coil configured to inductively couple the charger device to the first user device, wherein the coupling component further comprises a data interface configured to communicate data with the first user device;

receiving, from the first user device, an identifier of the first user device; and in response to determining that the user device has been charged to a predetermined level below a fully charged level, (i) transmitting, via the wireless interface to a second user device determined based on the identifier of the first user device, a second signal indicating the first user device is charged and (ii) broadcasting, via the wireless interface, a third signal indicating that the charging device is available.

18. The non-transitory machine readable medium of claim 17, wherein the first signal causes the first user device to provide a notification to charge to a user of the first user device.

19. The non-transitory machine readable medium of claim 17, wherein the operations further comprise in response to determining the charger device is coupled to the first user device, aborting a transmission of the first signal.

20. The non-transitory machine readable medium of claim 17, wherein the third signal includes the location information of the charger device.

* * * * *